United States Patent [19]

Ishihara et al.

[11] 4,419,330

[45] Dec. 6, 1983

[54] THERMAL REACTOR OF FLUIDIZING BED TYPE

[75] Inventors: Hideo Ishihara, Yokohama; Takahiro Ohshita, Kanagawa; Harumitsu Saito, Yokohama, all of Japan

[73] Assignee: Ebara Corporation, Tokyo, Japan

[21] Appl. No.: 319,875

[22] Filed: Nov. 9, 1981

[30] Foreign Application Priority Data

Jan. 27, 1981 [JP] Japan ................................ 56-10520
Jan. 29, 1981 [JP] Japan ................................ 56-10841

[51] Int. Cl.³ ........................... F27B 15/16; B01J 8/30
[52] U.S. Cl. ................................. 422/143; 422/139;
422/145; 34/57 A; 110/245; 165/104.16
[58] Field of Search ............ 422/139, 142, 143, 145;
110/245; 34/57 A; 165/104.16

[56] References Cited

U.S. PATENT DOCUMENTS

| | | | |
|---|---|---|---|
| 2,944,009 | 7/1960 | Huntley et al. | 422/139 X |
| 3,132,739 | 5/1964 | Jakobsson | |
| 3,370,938 | 2/1968 | Newman et al. | 422/142 X |
| 3,397,657 | 8/1968 | Tada | |
| 3,646,689 | 3/1972 | Kuchenthal et al. | 422/145 X |
| 4,330,502 | 5/1982 | Engström | 422/142 |

FOREIGN PATENT DOCUMENTS

| | | |
|---|---|---|
| 52-118858 | 10/1977 | Japan. |
| 55-20336 | 2/1980 | Japan. |
| 55-51220 | 4/1980 | Japan ................................ 110/245 |
| 55-118515 | 9/1980 | Japan. |
| 55-165416 | 12/1980 | Japan ................................ 110/245 |
| 55-168198 | 12/1980 | Japan. |
| 2007811A | 9/1981 | United Kingdom. |

OTHER PUBLICATIONS

Revue Generale De Thermique, vol. XX, No. 229, pp. 31–37.

*Primary Examiner*—Arhtur D. Kellogg
*Attorney, Agent, or Firm*—Wenderoth, Lind & Ponack

[57] ABSTRACT

A fluidized bed type thermal reactor having a furnace housing wherein there is substantially no partition wall and adapted to generate a downwardly descending moving bed portion and whirling fluidized bed portions at opposite lateral sides of the moving bed, respectively, whereby pre-shredding or crushing of material to be charged into the furnace is made substantially unnecessary. The reactor is provided with a unique feeder for charging the material so that the incombustible items the size of which is not suitable to be charged into the furnace are rejected by reversing the feeding direction of the feeder when the presence of such items is sensed.

15 Claims, 34 Drawing Figures

Fig. 14
Fig. 15
Fig. 16
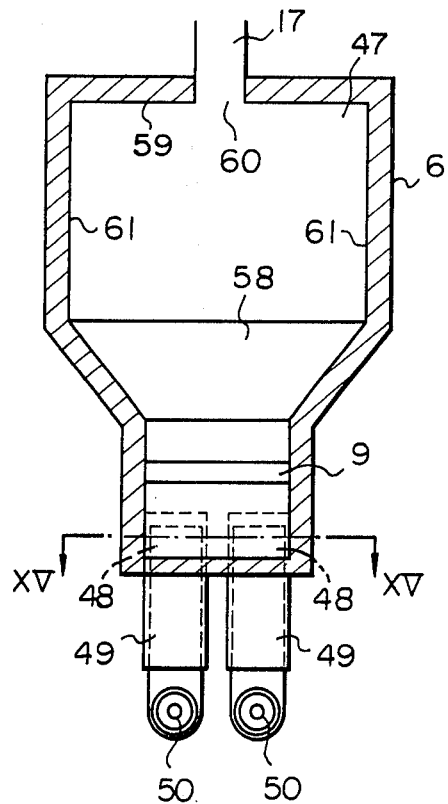
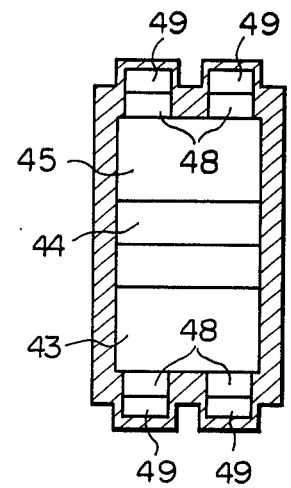
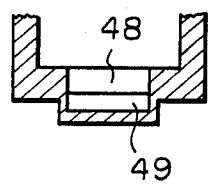

THERMAL REACTOR OF FLUIDIZING BED TYPE

FIELD OF THE INVENTION

The present invention relates to a thermal reactor and more particularly to a thermal reactor of the fluidized bed type utilized as an incinerator and a pyrolyzer, etc.

BACKGROUND OF THE INVENTION

In these days, a thermal reactor is largely utilized to incinerate municipal refuse for disposal although there are other processes available for disposing of the refuse.

For such incineration, a reactor of a fluidized bed type has been recently employed rather than a stoker since the fluidized bed type reactor is superior in incinerating efficiency and the amount of residue produced thereby relatively small.

If the incinerator having a fluidized bed is utilized, the materials to be incinerated are effectively incinerated in the beds almost instantaneously. There is substantially no moving elements in the portions exposed to the high temperature in the fluidized bed incinerator and, thus, there is little risk that these portions will be damaged. For the above and other reasons, the fluidized bed type incinerators have been generally considered desirable for disposal of refuse.

On the other hand, to maintain proper working conditions for smooth operation of the fluidized bed attention must be paid to several factors.

For instance, if the size of the materials to be charged into the bed varies, the fluidizing condition may be affected. That is, if the size of the refuse is beyond a certain size, it may obstruct fluidization of the fluidized medium and therefore the refuse has usually been shredded or crushed before being charged into the fluidized bed. Therefore, a shredder or crusher is required, thereby increasing the equipment cost and creating the necessity of space for installing such shredder or crusher. Also, the refuse generally contains several different kinds of materials including non-combustible materials such as metallic items, concrete blocks etc. or large combustible items which are not easily shredded such as bed clothes, blankets and fishing nets, etc. These items may cause abrasion or fracture of the shredding or crushing edges of the shredder or crusher and may impose an overload which stops the shredder or crusher whereby the maintenance cost is increased and the operational efficiency is decreased.

Also, in the fluidized bed, the charged material is instantaneously incinerated due to the fluidization and, thus, where a large quantity of the material is charged thereinto at one time, such material tends to burn spontaneously thereby temporarily causing imperfect combustion and generation of black smoke.

Therefore, in addition to the shredding operation explained above, the feed rate of the material to the fluidized bed has been preferably kept constant.

In most of the fluidized bed type incinerators, the main problems have resulted from failures in the shredder or crusher or in the feeder for feeding the shredded material at a uniform rate rather than from failures in the body of the combustion chamber itself.

Another problem encountered in the fluidized bed type incineration is that the materials, particularly organic materials, may be incinerated at the top of the fluidized bed and, thus, the generated heat produced by such incineration may not be recovered in most cases and is merely discharged through the free board of the fluidized bed. Also, in case of generation of pyrolysis gas, it is also usually consumed without the heat therefrom being utilized. Therefore, even when the incineration of the materials or combustion of the generated pyrolysis gas proceeds, the thermal energy derived therefrom has been wasted in most cases and, thus, the temperature of the fluidized medium or sand is gradually lowered during the process. Therefore, under such conditions auxiliary burning means is sometimes required to maintain the temperature of the sand at a certain level to continue the incineration. In order to utilize such thermal energy which heretofore was wasted and to obviate or reduce the need for an auxiliary burning means, the inside of the fluidized bed has been divided by a partition wall to produce a downwardly moving bed portion and a fluidized bed portion, the two portions being in communication with each other at the top portions and the bottom portions respectively so that the fluidized medium circulates between the two portions in such a way that the medium or sand descends together with the combustible items in the moving bed portion and is fed to the fluidized bed portion at the bottom and the sand and the combustible items are fluidized and incinerated within the fluidized bed portion while they are moved upwardly and then they are fed transversely again to the top of the downwardly moving bed portion. With this arrangement, the thermal energy generated during the incineration is properly recovered by the medium or sand. Such an arrangement is disclosed, for example, in UK Pat. No. 1577717.

However, with this arrangement too, there are several drawbacks as noted below.

a. The items having a large size may clog the gap between the lower end of the partition wall and the diffusion plate and this may disturb smooth circulation of the fluidized medium, lower the combustion efficiency and/or prevent the non-combustible items from being smoothly discharged.

b. Descending rate of the moving bed portion is small and the amount of circulating fluidized medium is limited whereby the capacity for incineration is limited.

c. The range within which the descending rate of the moving bed can be controlled is small.

d. The pyrolysis gas generated during the descent is prevented from being delivered to the combustion zone, i.e. the fluidized bed, whereby such gas is merely burnt in the free board without being used for heating the medium.

e. Since the fluidized bed portion generally surrounds the moving bed portion, the feeding duct for the refuse traverses the portion above the fluidized bed portion whereby the duct is subjected to abrasion, corrosion and/or deformation which may result in clogging of the duct.

f. Because of the presence of the partition wall and/or duct within the space of the thermal reactor, inspection or repair of the inside of the thermal reactor is obstructed and inconvenient.

Accordingly, it has been desired to have a thermal reactor or incinerator which is free from the drawbacks described above.

SUMMARY OF THE INVENTION

It is an object of the present invention to provide a thermal reactor or incinerator of the fluidized bed type wherein the need for an auxilary burning means is minimized by fully utilizing the heat generated during the incineration.

It is also an object of the present invention to provide a thermal reactor or incinerator of the fluidized bed type which does not require shredding or crushing of the materials to be charged thereinto.

It is another object of the present invention to provide a thermal reactor or incinerator to which the materials to be incinerated are able to be charged preferably at a constant rate.

It is still another object of the present invention to provide a thermal reactor of the fluidized bed type in the inside of which the number of elements such as separating means is kept to minimum while the incinerating efficiency and the capacity thereof are improved.

Another object of the present invention is to provide a thermal rector of the fluidized bed type in which fluidization is easily maintained during operation.

SUMMARY OF THE INVENTION

According to the present invention, a reactor of novel construction is provided by which the above objects are accomplished.

The apparatus of the present invention incorporates the thermal reactor as a primary portion and a thermal reactor is a fluidized bed type. The thermal reactor is arranged to generate two types of fluidized beds, one being a whirling type (referred to simply as a fluidized for convenience in the present description and claims) and the other being a descending fluidized bed (referred to simply as a moving bed). These two types are able to be generated without providing a partition wall or separating wall inside of the reactor whereby the necessity of shredding or crushing refuse before the refuse is charged into the reactor is reduced or obviated.

To improve the efficiency of the reactor having no internal partition wall, the refuse feeder is devised to reject the large incombustible items and admit medium size incombustible items the size of which will not harm the operation of the reactor.

The present invention and its objects and advantages discussed above as well as others will be more readily understood when the detailed description of the preferred embodiments is reviewed together with the accompanying drawings, a brief explanation of which is given below as an introduction to the detailed description of the embodiments.

BRIEF EXPLANATION OF DRAWINGS:

FIG. 14 is a cross sectional view taken along line XIV—XIV in FIG. 13;

FIG. 15 is a sectional view taken along line XV–XV in FIG. 14;

FIG. 16 is a partial view similar to that shown in FIG. 15 and showing a modified form;

DETAILED DESCRIPTION OF PREFERRED EMBODIMENTS

Now the present invention will be described with reference to the embodiments in which an incinerator for incinerating municipal refuse is employed as an example for the purpose of explanation.

Figure 1:
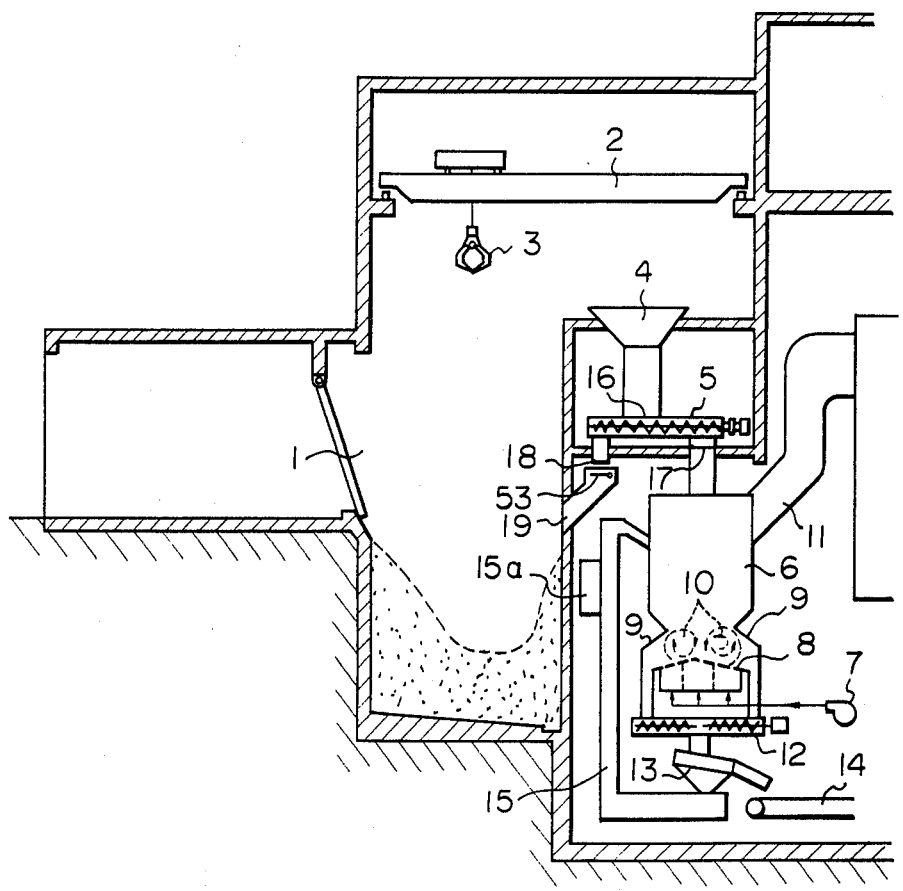
FIG. 1 is a sectional front view of the refuse incinerating plant.

Referring to FIG. 1, there is shown an incineration plant for incinerating municipal refuse.

The municipal refuse is temporarily stored in a pit 1 across which a carriage 2 is moved to pick up the refuse by a bucket 3 hanging from the carriage 2. The refuse picked up in the bucket 3 is charged into a hopper 4 from where the refuse is fed by a refuse feeder 5 to an incinerator 6. The feeder 5 and the incinerator 6 are explained in further detail hereinafter since these portions constitute the important parts of the present invention. A blower 7 is provided to supply fluidizing gas upwardly into the incinerator through a diffusion means 8 disposed at the lower part of the incinerator 6 so as to fluidize the fluidizing medium or sand above the plate means 8. The manner of the fluidization will be further explained later in connection with FIGS. 13 through 18, but it is simply stated here that the fluidized medium is forced to move upwardly adjacent the side walls of the incineator 6 by the upwardly injected gas and the flow of the medium is directed against inclined deflecting walls 9 so that whirling fluidized flows 10 will be created there as well as a downwardly descending bed between the whirling flows 10.

For the convenience of explanation, whirling fluidized flows 10 are hereinafter referred to as "fluidized beds" and the downwardly descending bed is simply referred to as "a moving bed" which will also be discussed in connection with FIGS. 13 through 18. Due to the presence of these fluidized beds and the moving bed, the refuse is satisfactorily incinerated without obstruction to fluidization even though preshredding of the refuse is not performed before the refuse is charged into the incinerator.

The gas from the incinerated refuse is discharged through an exhaust gas duct 11 and the residue of the non-combustible items is discharged through a dicharging device 12, and a vibratory sieve 13 by which the medium or sand may be recovered and returned through a sand elevator 15 to the incinerator 6 or to a sand reservoir 15a associated with the elevator 15 and, depending on the amount of the sand within the incinerator 6, the recovered sand may be stored in the reservoir 15a or the sand is supplied to the incinerator 6 from the reservoir 15a to which the sand is also supplied from a source as required. After the sieving, the incombustible residue is taken away by a discharge conveyor 14.

The refuse feeder 5 receives the refuse from the hopper 4 through an inlet port 16 and discharges the refuse through an outlet port 17 into the incinerator. However, the feeder 5 discharges through a discharge port 18 the refuse which has an improper size for charging into the incinerator 6. Such operation of the feeder will be explained hereinunder referring to FIGS. 2 through 12.

Figure 2:
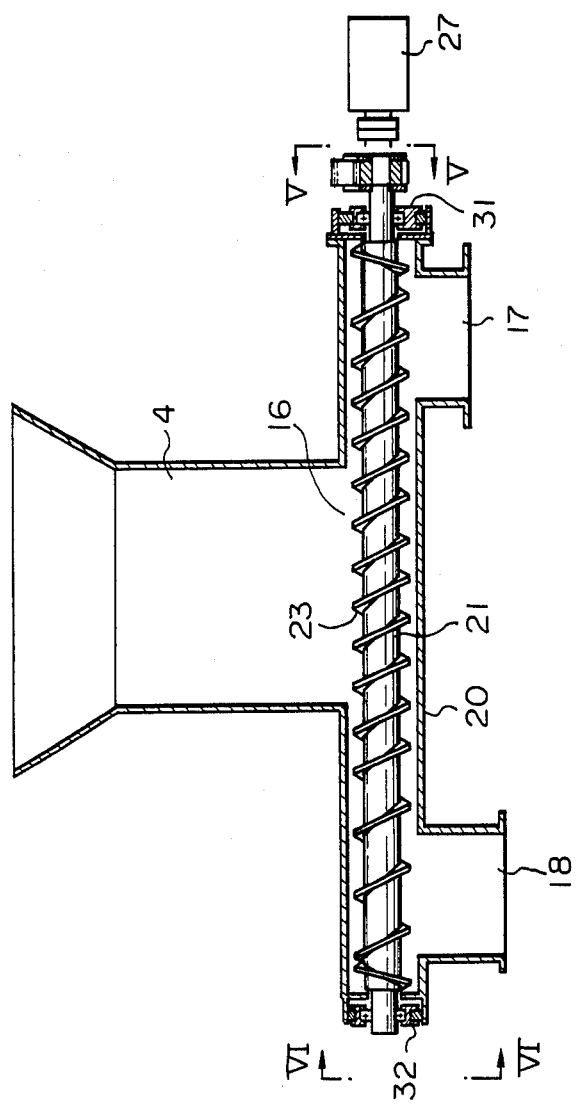
FIG. 2 is a sectional side view of a feeder used in the plant shown in FIG. 1.
Figure 3:
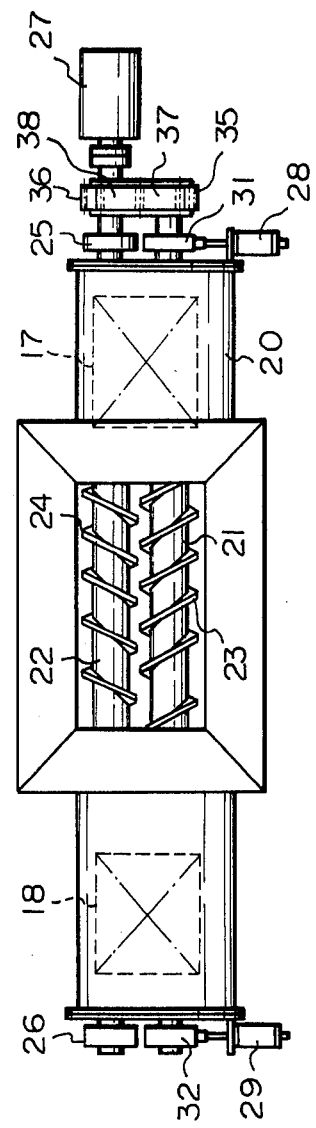
FIG. 3 is a plan view of the feeder shown in FIG. 2.
Figure 4:
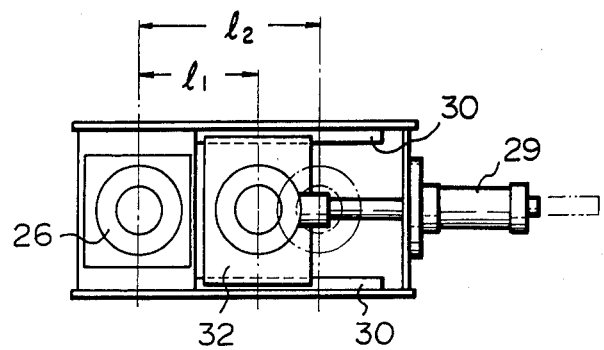
FIG. 4 is an end view of the feeder as seen in a direction IV—IV in FIG. 2.

The basic construction of the feeder 5 is illustrated in FIGS. 2 and 3. As shown in these drawings, a housing 20 of the feeder 5 is coupled with the hopper 4 through the inlet port 16 and the outlet port 17 is disposed at the lower side of the housing 20 at one end thereof and the discharge port 18 is disposed also at the lower side of the housing 20 at the other end of the housing 20. As shown in FIG. 1, below the discharge port 18 is a damper 53 for temporarily holding back the items which are mostly incombustible and too large in size to be charged into the incinerator 6. 19 designates a chute for returning the refuse to the pit 1. Within the housing 20, two screws 21 and 22 are rotatably mounted in positions substantially parallel to each other. The screws 21 and 22 are provided with spiral stripes or blades 23 and 24, respectively, one of which, the strip 23, is in the opposite or reverse orientation to the other strip 24. The helical pitch of the strips 23 and 24 is larger at the portions adjacent the outlet port 17 than that at the portions adjacent the inlet port 16. Screw 22 is journaled in bearings 25 and 26 and is adapted to be driven by a motor 27. Since the bearings 25 and 26 are stationary relative to the housing 20, the position of the axis of the screw 22 is also kept stationary. On the other hand, the other screw 21 is journaled in displaceable bearings 31 and 32 which are arranged to be movable along guide rails 20 as shown in FIG. 4 by the force of cylinders 28 and 29. The cylinders 28 and 29 are arranged to move a substantially equal distance when they move whereby the screw 21 is displaced within an adjustable range between $l_1$ and $l_2$ while remaining in a substantially parallel relationship with the screw 22.

Figure 5:
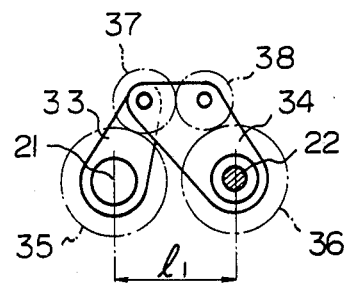
FIG. 5 is a schematic end view of the feeder as seen in a direction V—V in FIG. 2.
Figure 6:
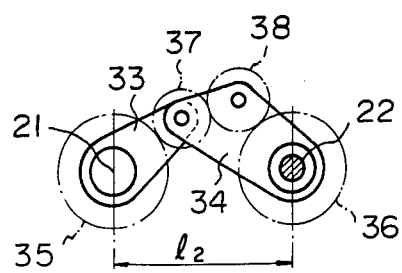
FIG. 6 is an end view similar to that shown in FIG. 5 but illustrates the situation when the spacing between a pair of parallel screws in the feeder is increased.

As illustrated in FIGS. 3, 5 and 6, the screw 21 is also driven by the motor 27 at the same time the motor drives the screw 22. The rotation of the screw 22 is transmitted to the screws 21 through gears 35, 36, 37 and 38 to rotate the screw 21 in a direction opposite to that of the rotation of the screw 22. The gear 35 is mounted on the shaft of the screw 21 and the gear 36 is mounted on the shaft of the screw 22 and these two gears 35 and 36 are meshed with the intermediate gears 37 and 38 which are rotatably mounted on pivotable links 33 and 34 so that, irrespective of the variation of the distance between the screws 21 and 22, the meshing condition of these gears is maintained. The link 33 is pivotable about the axis of the screw 21 and maintains the relationship between the gears 35 and 37 while the link 34 pivots about the axis of the screw 22 amd maintains the relationship between gears 36, 37 and 38 when the distance between the axes of the screws 21 and 22 is caused to vary as explained below.

Under the normal feeding condition, the screws 21 and 22 revolve in opposite directions so that the spiral strips 23 and 24 approach each other at the upper position near the inlet port 16 and move away from each other at the lower portion to advance the refuse to the outlet port 17. That is, as viewed in FIGS. 5 and 6 from the end adjacent the motor 27, the screw 21 rotates clockwise and the screw 22 rotates counterclockwise.

Figure 7A:
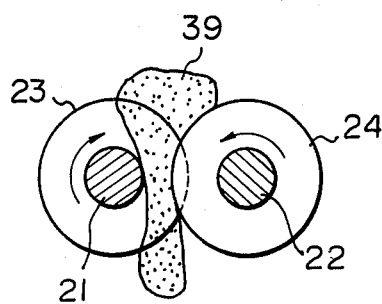
FIGS. 7(a) and 7(b) are schematic end and plan views showing how the refuse is compressed in the feeder.
Figure 7B:
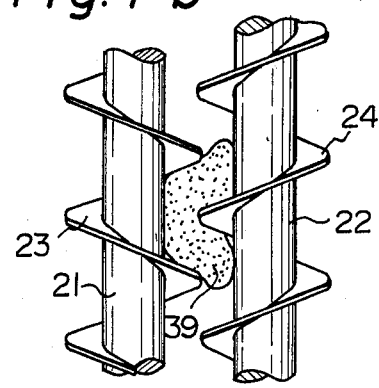

Although the feeder 5 is mainly utilized to feed the refuse to the incinerator 6, the screws 21 and 22 may also break the items contained in the refuse and/or break the bags and/or containers into which the refuse is packed. This effect is illustrated in FIGS. 7(a)-9(b). In FIGS. 7 (a) and (b), refuse 39 is dragged into the nip of the two screws and deformed and/or broken under the pressure, passed therethrough to the lower position and conveyed to the outlet port 17.

Figure 8A:
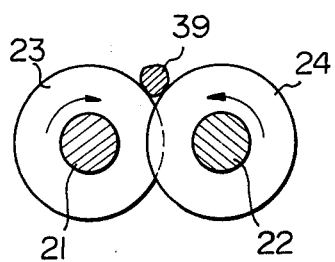
FIGS. 8(a) and 8(b) are schematic end and plan views showing how the refuse is moved along the feeder.
Figure 8B:
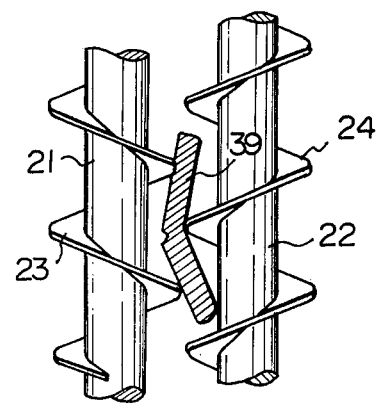

In FIGS. 8(a) and (b), the long refuse 39 is bent and broken between spirals 23 and 24.

Figure 9A:
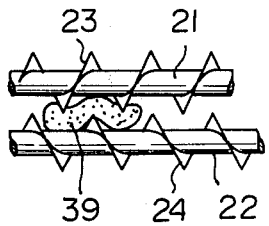
FIGS. 9(a) and 9(b) are schematic plan views showing how bags containing refuse are broken in the feeder.
Figure 9B:
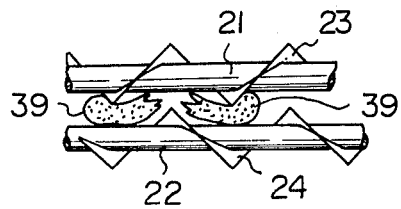

FIGS. 9(a) and 9(b) illustrate how the bag or container is broken by the variation of the pitch of the strips 23 and 24, namely the larger pitch tends to tear the bag as it is advanced. When the refuse 39 is dragged into the space between the two screws as shown in FIGS. 7(a)-9(b), the screws 21 and 22 are urged by the refuse in a direction tending to increase the distance between the axes of the screws 21 and 22.

If such force becomes too large, it may damage the screws or other elements of the feeder. Also, it is necessary not to feed lumps of incombustible constituents of the refuse the size of which is beyond the allowable limit. To such end, the distance between the axes of the two screws 21 and 22 is regulated.

As explained before, in the illustrated embodiment heretofore described, the screw 22 is supported stationarily while the screw 21 is supported so as to be displaceable relative to the stationary screw 22. The regulation of the distance between the axes will be explained hereinunder.

Taking into consideration the design of the incinerator, the residue discharging capacity and maintaining the effective fluidizing state, the distance between the axes of the two screws 21 and 22 is predetermined as $l_1$: minimum distance,
$l_2$: largest distance, and
$l_3$: allowable upper limit distance.

The space between the two screws corresponding to these distances is identified by $S_1$, $S_3$, and $S_3$, respectively in FIGS. 10(a)–10(d) $S_2$ is determined so that the foreign incombustibles less than this dimension passed therethrough will be discharged from the incinerator. For instance, the following demensions are one of the examples but these data are only for the convenience of explanation and are not intended to the dimensions of the feeder according to the present invention.

$S_1 = 125^{mm}$
$S_2 = 325^{mm}$
$S_3 = 225^{mm}$

The force derived from the refuse tending to increase the distance between the axes of the screws 21 and 22 may be sensed as hydraulic pressure in the cylinders 28 and 29. The way in which the permissible limit on the expanding force may be set, for example, in a hydraulic system as illustrated in FIG. 12, which is to be explained later.

Figure 10A:
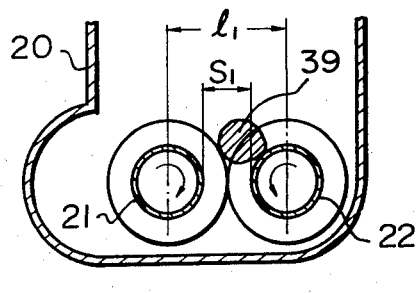
FIGS. 10(a)–10(d) are transverse sectional views of various modes of operation of the feeder screws.
Figure 10B:
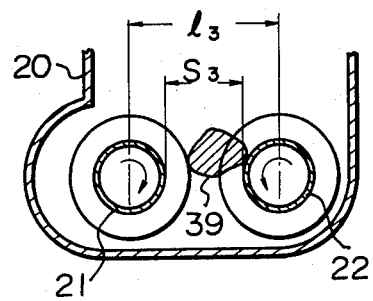

Under the normal feeding operation, the distance (1) between the axes of the two screws 21 and 22 is set to be $l_1$ (i.e. minimum) as illustrated in FIG. 10(a). If large pieces of refuse or incombustible lumps are dragged between the screws and cause the expanding froce to go beyond the preset allowable limit, then the distance "l" is regulated within the range of $l_3 \geq l \geq l_1$ so as to decrease the expanding force below the allowable limit.

The screws are rotated continuously during the variation of the distance "l", while the feeding of the refuse and breaking of the bags continue.

Figure 10C:
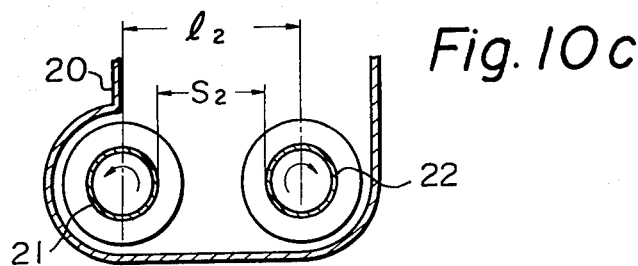

Should the expanding force be sensed as beyond the allowable limit even when the distance is increased to "$l_3$" due to the existence of large foreign items, the screws 21 and 22 are further separated from each other so that the distance "l" becomes "$l_2$" and the respective rotating directions of the screws are reversed as illustrated in FIG. 10(c) whereby the foreign items are conveyed in an opposite direction toward the discharge port 18.

The hydraulic system illustrated in FIGS. 11(a) through (f) is a example of means for regulating the distance "l" as described above. Now the operation and effect of this system will be explained hereunder.

In FIGS. 11(a)–11(f), the thick lines are pressurized lines and the dash lines are auxiliary lines for transmitting pressures to the check valves so that limited reverse flow therethrough is permitted.

Figure 11A:
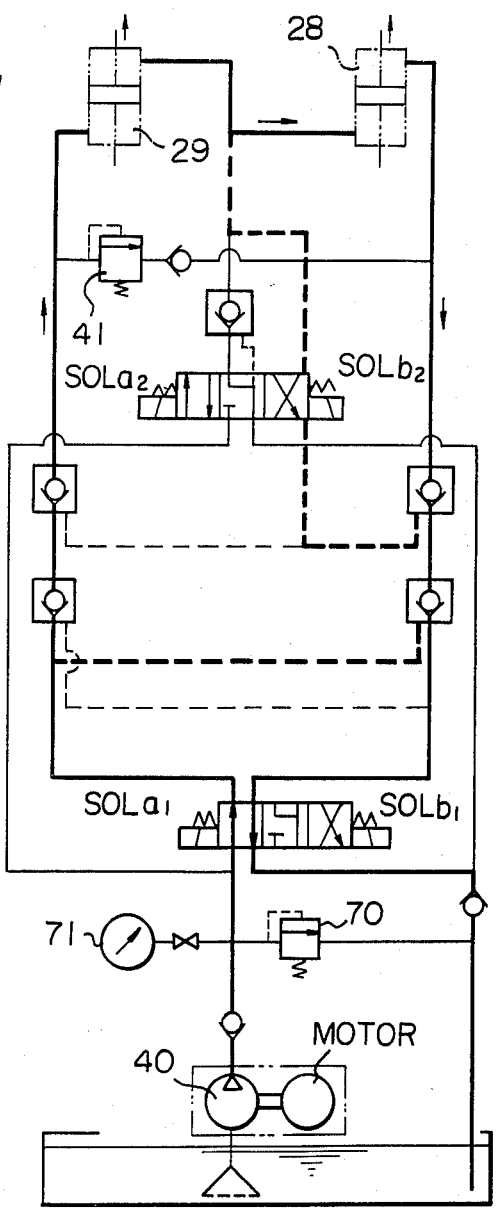
FIGS. 11(a)–11(f) are diagrams of the hydraulic system in various modes of operation for controlling the spacing between the screws of the feeder.

At first, a hydraulic pump 40 is actuated and a solenoid SOLa$_1$ is energized so as to cause both the cylinders 28 and 29 to advance as illustrated in FIG. 11(a).

Figure 11B:
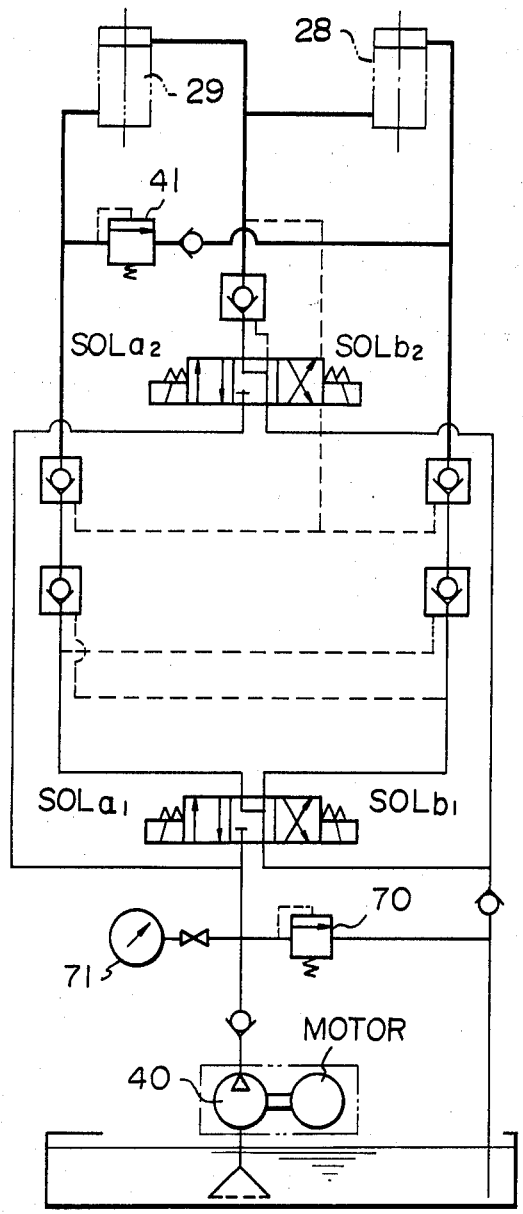

When the distance "l" becomes "$l_1$", the advancement of the cylinders is stopped by a stop or limit switch and all the solenoids are deenergized. Then the motor 27 is actuated to effect the feeding of the refuse. During the normal operation, cylinders 28 and 29 are hydraulically locked, as illustrated in FIG. 11(b), to maintain the distance "l" between the axes of the two screws at "$l_1$".

Figure 11C:
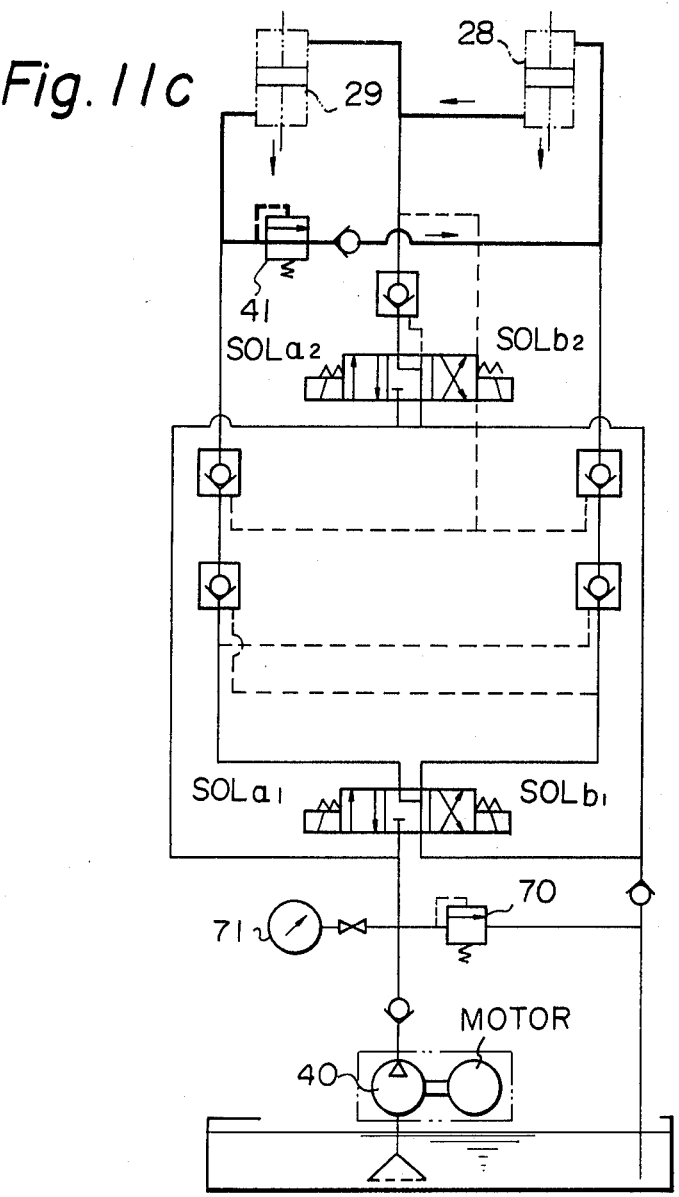

If incombustible constituents of small or medium size such as steel scrap, auto-parts etc. which may be discharged from the incinerator without trouble, are dragged into the spaces between the screws, the expanding force caused thereby may be increased beyond the predetermined value and the cylinders 28 and 29 receive a pressure larger than the pre-set pressure corresponding to the predetermined expanding force. This condition is illustrated in FIG. 11(c).

The pressure corresponding to the allowable limit of the expanding force may be pre-set by a safety valve 41.

When the expanding force exceeds the allowable limit, the safety valve 41 is opened to cause the cylinders 28 and 29 to retract equally until the expanding force decreases to a level lower than an allowable limit whereupon the increasing of the distance "l" is stopped at a position within the range of $l \leq l_2$. During this retraction, the screws 21 and 22 continue to be driven and after the distance "l" is set as above, the feeder continues its operation with the increased distance "l" and after the foreign items that caused the retraction are discharged into the incinerator, the operation described in connection with FIG. 11(a) is repeated to return the distance "l" to "$l_1$".

If a large size foreign item such as a gas cylinder, a motor, an oil heater, a tire, a lid for a manhole etc. is received by the screws 21 and 22, the distance "l" between the axes is also increased in a manner similar to that described in connection with FIG. 11(c).

Figure 11D:
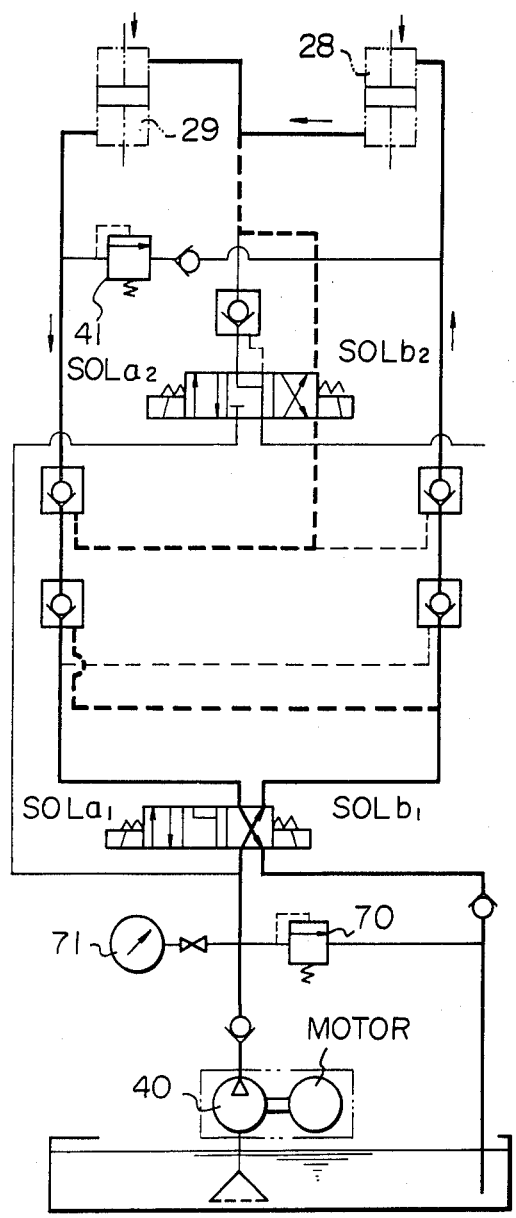

If the expanding force is still beyond the allowable limit and the distance between the axes reaches the value of "$l_3$", the motor 27 is stopped, and a solenoid SOLb$_1$ is energized so as to cause the cylinders 28 and 29 to retract further as illustrated in FIG. 11(d) and the motor 27 is actuated so that it rotates in reverse to also drive the screws 21 and 22 in reverse to feed the large item toward the discharge port 18. When the distance "l" reaches "$l_2$", all the solenoids are deenergized while the screws 21 and 22 continue to rotate in reverse. After the item is discharged through the discharge port 18, the screws 21 and 22 are changed to rotate in the opposite direction and the solenoids SOLa$_1$ is energized to cause the cylinders 28 and 29 to advance until the distance "l" reaches "$l_1$".

Figure 11E:
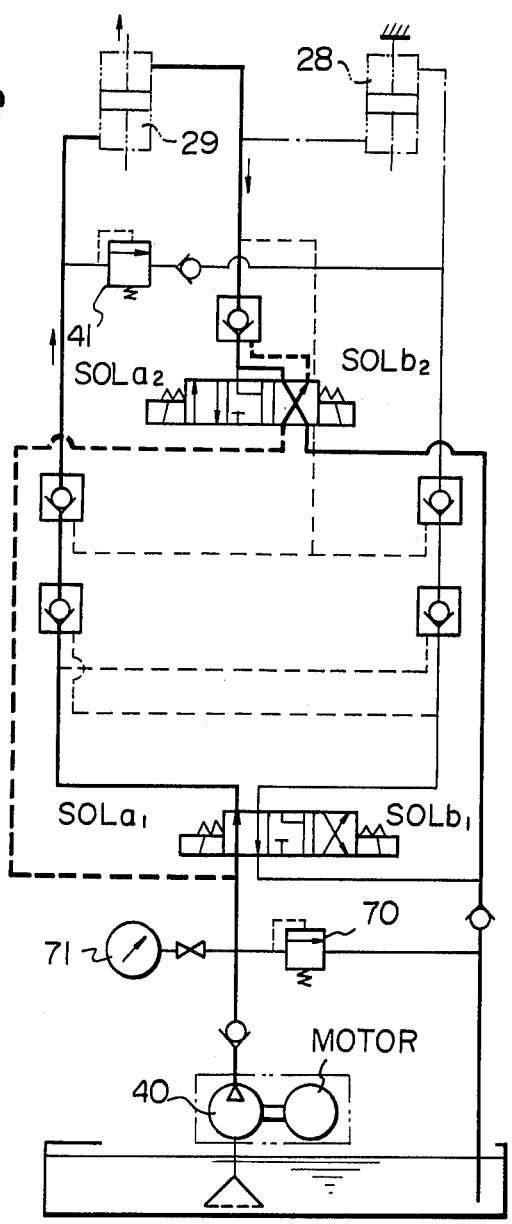
Figure 11F:
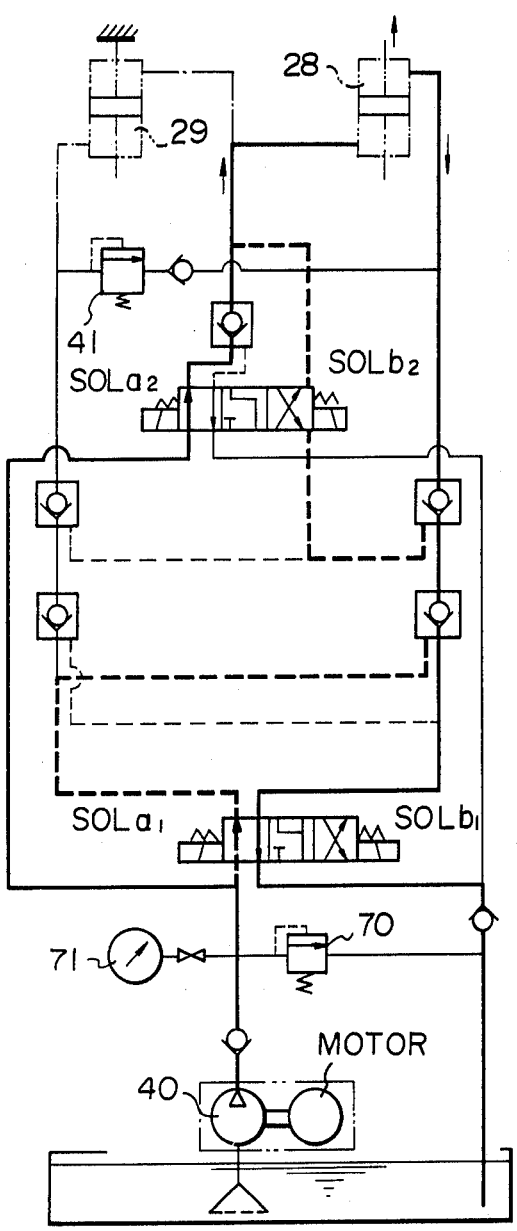

Should the screws 21 and 22 move out of parallel due to leakage of oil in the cylinders 28, 29 or other portions in the system, one or the other of solenoids SOLa$_2$ or SOLb$_2$ is turned on together with the solenoid SOLa$_1$, as illustrated in FIG. 11(e) and FIG. 11(f) wherein the former is the advancement of the cylinder 29 and the latter is the advancement of the cylinder 28. Such relative movement of the cylinders compensates for the condition so that the screws 21 and 22 are restored to parallel relationship.

A safety valve 70 and a pressure gage 71 may be conveniently provided for the hydraulic system.

Also, synchronized cylinders may be employed for a synchronous operation in place of the cylinders 28 and 29.

The force acting to separate the screws 21 and 22 may be sensed by detecting the hydraulic pressure in the cylinders 28 and 29 as above; however, such sensing may also be effected by means of a spring or a load-cell. Also, mechanical or electrical sensing by detecting the torque of the motor 27 or the screws 21 and 22 may be used.

While it has been described above that one of the screws 21 and 22 namely, the screw 22 is stationary and the other screw 21 is displaceable, both may be arranged to be displaceable. A desired number of sets each comprising a pair of parallel screws similar to the screws 21 and 21 may be provided.

Figure 10D:
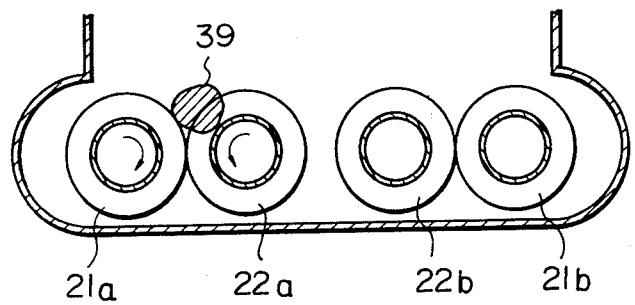

Such multiple arrangement is useful, for example, when the width of the incinerator 6 is large in a direction normal to the plane of FIG. 1 so as to increase the processing capacity of the reactor 6. Also, if it is desirable to feed the material or refuse to the reactor at a substantially constant rate, a double set of screws such as illustrated in FIG. 10(d) is useful. In this case, one pair of screws 21a and 22a and the other pair of 21b and 22b are preferably arranged to meet the desired constant rate independantly and one of the pairs is always driven to feed the refuse at the constant rate. Should the pair under carrying out the feeding operation encounter the condition represented in FIG. 10(c), the other pair is put into operation to maintain the desired constant feed rate.

While modes of the retraction and/or advancement of cylinders 28 and 29 and the actuation of the motor 27 and solenoids have been explained in the foregoing, such operation may conveniently be performed automatically by providing a control system (not shown) such as a logic control system.

In such a feeder as described in the foregoing wherein screws are disposed so that the spacing therebetween is laterally adjustable, it is usually required to provide a space between the displaceable screw and the housing wall to accommodate the lateral movement of the screw 21 as seen in FIG. 10(a). Thus, when the feeder 5 is carrying out the normal feeding operation as shown in FIG. 10(a), the refuse charged from the hopper 4 may enter the space between the side wall of the housing 20 and the screw 21 and may be packed therein thereby creating a wedging effect and making it necessary to stop the operation to remove the refuse clogged therein. Therefore, in order to obviate such drawbacks, a modified form of the feeder is provided as illustrated in FIGS. 12(a)-12(c) wherein the same references as employed in the foregoing are also used to designate the elements similar to those described in connection with the other drawings.

Figure 12A:
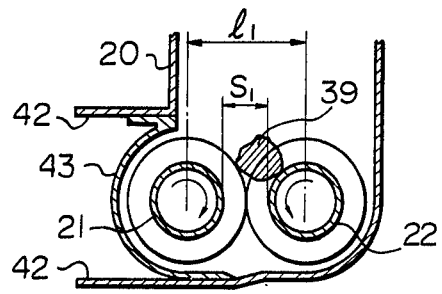
FIGS. 12(a)–12(c) are views similar to FIGS. 10(a)–10(c) showing a modified embodiment in which the side wall of the feeder is displaceable.
Figure 12B:
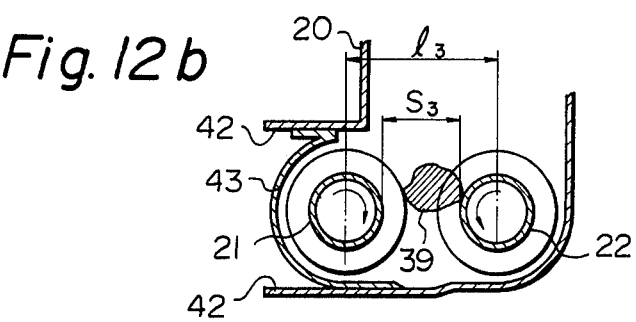
Figure 12C:
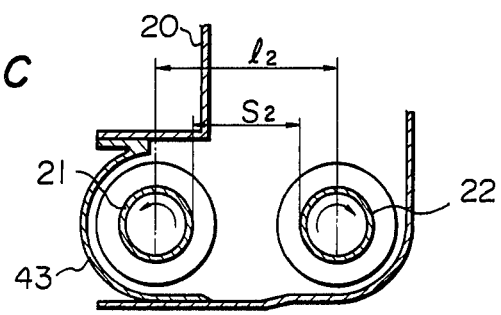

In the modified feeder illustrated in FIGS. 12(a)-12(c) the housing 20 is provided with a side wall 43 which is arranged to be laterally displaceable along guides 42. The side wall 43 is interconnected with the screws 21 so that the side wall 43 and the screw 21 may laterally displace together. As can readily be appreciated by comparison of the drawings. FIGS. 12(a), (b) and (c) correspond to FIGS. 10(a), (b) and (c), respectively with respect to the lateral displacement of the screw 21. By the modification illustrated in FIGS. 12(a)-12(c), the problem due to the presence of the space between the housing wall and the displaceable screw is solved.

Now the reactor or incinerator 6 which is the main part of the plant shown in FIG. 1 will be described referring to FIGS. 13, 14 and 15. The reactor 6 comprises a wall structure or furnace housing 80 which defines a furnace space or chamber therein.

The furnace housing 80 is a generally upstanding or vertical tower and its horizontal cross section is preferably rectangular. The diffusion plate means 8 comprising diffusion plates 42 is disposed at the lower portion of the furnace housing 80 so that the opposite edges of the plate means 8 are lower than the center portion to a roof-like or chevron cross-sectional shape substantially symmetrical about the center line 57 of the reactor. The degree of inclination of the plates 42 may be varied at the edges and the center. At both sides of the reactor 6, discharge openings 48 are provided in communication with the opposite edges of the diffusion plate means 8. The configuration of the discharge openings 48 may not necessarily be the same on the opposite sides, for example that shown in FIGS. 15 or 16 as long as the flow of the fluidized medium is kept substantially the same on both the left side and right side about the center line 57.

The fluidizing gas or air is supplied from the blower 7 through gas chambers 43, 44 and 45 and upwardly through the diffusion plate means 8 (plates 42) to fluidize the fluidized medium or sand. The mass flow of the fluidizing gas or air (Kg/m$^2$.sec) blown up through the side gas chambers 43 and 45 is arranged to be large enough to produce the fluidized bed but the mass flow of the gas blown up through the center gas chamber 44 is less than that through the side chambers 43 and 45. For example, the mass flow of the fluidizing gas or air blown up through the gas chambers 43 and 45 is 4-20 Gmf and preferably 6-12 Gmf while the mass flow of the fluidizing gas or air blown up through the center gas chamber 44 is 0.5-3 Gmf and preferably 1-2.5 Gmf where 1 Gmf is an indication of the mass flow of the fluuidizing air or gas for minimum fluidization of a bed—i.e. just past the incipient condition.

The number of gas chambers is optimally selected to be three or more and the mass flow of the fluidizing gas passing through these chambers is arranged to be larger the nearer the chambers to the sides of the housing 80.

Figure 13:
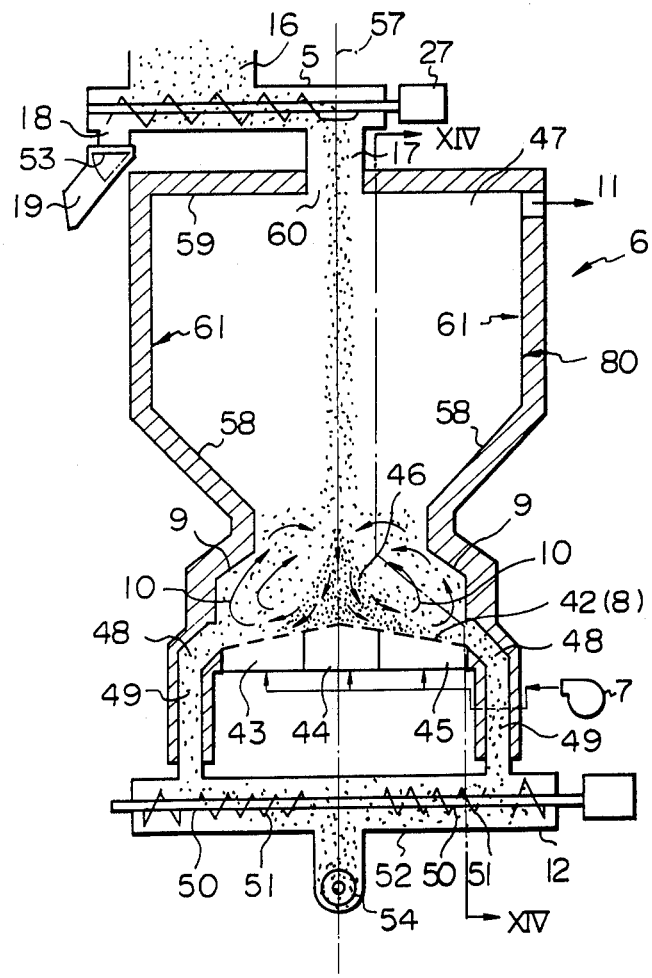
FIG. 13 is a vertical cross sectional view of the reactor forming part of the plant shown in FIG. 1.

In the embodiment shown in FIG. 13 where the number of the gas chambers is selected to be three, inclined walls 9 are provided just above the side chambers 43 and 45 as deflecting means for deflecting the fluidizing gas towards the center of the reactor 6. The upper sides of the respective inclined walls 9 are also oppositely inclined as inclined walls 58 so that the fluidized medium will not be collected thereon.

The inclination of the diffusion plates 42 is preferably 5-15° relative to the horizontal and the inclination of the walls 9 is preferably 10-60° relative to the horizontal. The surface of the walls 9 need not necessarily be planar; it may also be concave or convex provided that it effectively deflects the upwardly directed flow to the center of the reactor 6.

A material charging port 60 is provided in the ceiling portion 59 of the reactor 6, and in a position above the center gas chamber 44 so as to communicate with the outlet port 17 of the feeder 5.

As illustrated in FIG. 13, there is no separating means or chute in the inner space of the reactor 6 between the ceiling 60 and the diffusion plate means 8 (42), and only a free board 47 is defined by the side walls 61, ceiling 60 and the upper inclined walls 58. Of course, the lower border of the free board 47 is not clearly defined relative to the fluidized bed portion. The inclined walls may be constructed by arranging pipes through which the fluidizing gas or air may be passed so as to be pre-heated before being blown up through the chambers 43, 44 and 45. The gas passing through such pipes may also serve to cool the walls 9.

Due to the difference with respect to the mass flow above the diffusion plate means 8 (plates 42) depending on whether the portion is adjacent the side walls or the center, the fluidized medium or sand near the side walls or above the chambers 43 and 45 receives the strong upwardly injected flow of the gas or air and is fluidized to cause whirling flows 10 which were described as "fluidized beds" in FIG. 1.

The presence of the inclined walls 9 serves to deflect the upwardly directed flow of the mixture of the gas and the sand toward the portion above the center chamber 44 where the fluidization is rlatively weak compared to the portions above the side chambers 43 and 45 whereby the whirling of the fluidized beds 10 is maintained and the downwardly descending moving bed 46 is formed at the intermediate portion between the fluidized beds 10.

Although the bed 46 is referred to as the "moving bed", most of it is in the state of fluidization due to the difference in the mass flow upwardly directed, the degree of fluidization there is weak compared to that of the fluidized beds 10 and, thus, the sand in the moving bed exhibits a descending condition relative to the fluidized beds 10. The width of the moving bed 46 is relatively narrow at the upper part thereof and becomes wide towards the diffusion plates 42 where the sand spreads to the opposite sides due to its own weight and the inclination of the plates 42 and is injected into the fluidized beds 10 and, thus, the whirling and circulation of the sand is continued. The combustible items in the refuse charged through the port 60 from the feeder 5 may be trapped in the downwardly descending moving bed 46 and move downwardly therewith without simply floating on the surface of the bed.

During the downward movement of the combustible items, they may be subjected to pyrolization and pyrolysis gas is generated which, due to the absence of separating means within the internal space of the reactor, may diffuse laterally to the fluidized beds 10 where it is burnt together with the char or combustible items already subjected to pyrolyzation and entrained in the fluidized beds from the bottom of the moving beds 46. Thus, the pyrolyzed gas and combustible items contribute to raise the temperature of the sand thereby regenerating the same.

Because of the presence of the moving bed 46 below the charging port 60, any of the charged items which do not instantaneously reach the top of the chamber 44 even though it is large in size or heavy in weight irrespective of whether it is combustible or not will gradually descend with the moving bed 46. Accordingly, even if the size of the combustible items is large, most of them will be dried, pyrolized or partially incinerated during the downward movement in the moving bed 46 and reduced to a smaller size whereby they will not obstruct the formation of the fluidized beds. Also, the refuse is quickly diffused into the fluidized medium whereby the incinerating efficiency is increased. The symmetrical arrangement of the deflecting walls 9, side walls, diffusion plates 42 and discharge ducts 49 serves to maintain stabilized fluidization.

As disccussed in the preamble portion of the present specification, a particular shredding or crushing operation is not required in the present invention and breaking of the bags by the feeder is enough whereby the total apparatus can be made compact.

The incombustible items charged by the feeder 5 are displaced downwardly within the moving bed 46 and combustible items associated with said incombustible items (such as insulating layers covering wires) are burnt during the movement and the incombustible items are discharged outwardly of the reactor 6 by the inclined diffusing plates 42 and through the discharge openings 48. The discharge openings 48 are communicated with a dischange device or screw conveyor 12 through vertical passages 49. The screw conveyor 12 comprises a screw 50 the blade 51 of which is spaced from the casing 52 of the conveyor so that the incombustible residue will be received within the casing and advanced by the rotation of the screw 50 toward another screw conveyor 54 which may be disposed above the vibrating sieve 13 or in place of the sieve 13 shown in FIG. 1.

The incombustible items conveyed to the discharge port 18 may be temporarily held at the damper 53 and these items may be removed manually or mechanically and, thereafter, the damper 53 can be actuated manually or mechanically to discharge small refuse accumulated thereon to the pit 1.

Now the effect of the fluidizing gas will be discussed referring to FIGS. 17 and 18.

As to the moving bed 46, if the mass flow of the fluidizing gas is too small, the fluidization activity is lost and the fluidized medium will merely be piled up and, if it is too large, a descending moving bed will not be generated and the usual fluidized bed will be generated instead. As illustrated in FIG. 17, which is the result of the study by the present inventors, when the amount of the fluidizing gas for the moving bed 46 is increased, fluidity of the moving bed 46 is promoted so that the descending rate of the moving bed 46 is increased which means that the items of the refuse entrapped within the moving bed 46 quuickly reach the fluidized beds 10 and are incinerated sooner and the circulating rate of the fluidizing medium is also increased wherby the processing capacity of the reactor is also increased.

However, if the amount of the fluidizing gas for the moving bed is increased beyond a certain value (for example, the neighbourhood of 3 Gmf in FIG. 17), the descending moving bed 46 may not be generated. According to the investigation by the present inventors, it was found that the mass flow of the fluidizing gas for the moving bed is preferably in the range of 0.5–3 Gmf and more preferably in the range of 1–2.5 Gmf.

Figure 17:
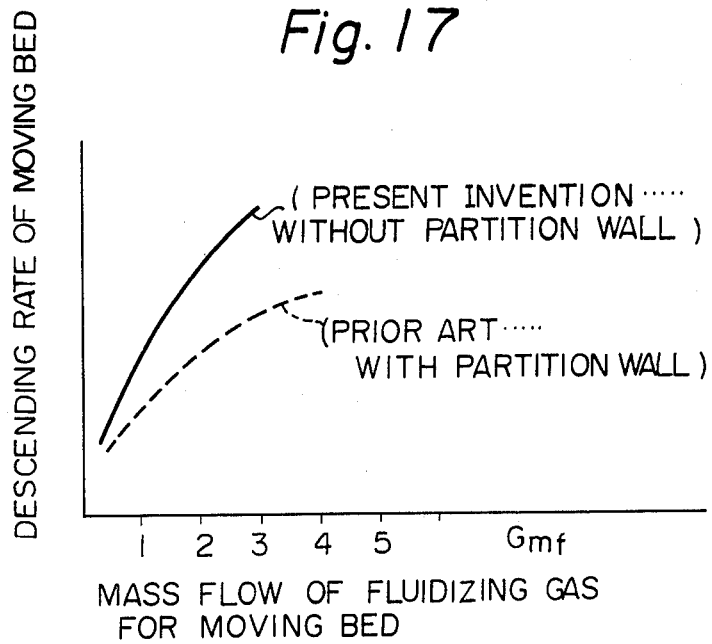
FIG. 17 is a graph illustrating the relationship between the descending rate of the moving bed and the mass flow of the fluidizing gas for the moving bed.

The curve shown in FIG. 17 by the dotted line represents the relationship similar to that shown by the solid line but the dotted line is for the moving bed in a reactor having a separating plate between the fluidized bed and the moving beds. It is noted that the moving bed is still generated even if the mass flow is increased to a value as large as 4 Gmf in the reactor having a separating plate surrounding the moving bed because the separating plate serves to maintain the moving bed. However, as discussed earlier, the provision of the separating wall causes several drawbacks such as discussed earlier.

As seen from FIG. 17, the possible range for fluidization in the moving bed is wider in the reactor having the separating wall than that in the present invention but the descending rate of the moving bed in the present invention is higher than that in the reactor of the prior art having the separating wall and the curve of the present invention is steeper than the dotted line. This means that the control range for the descending rate of the moving bed is wider in the present invention than that of the prior art and a small variation in the mass flow in the present invention results in a larger variation of the descending rate of the moving bed.

Figure 18:
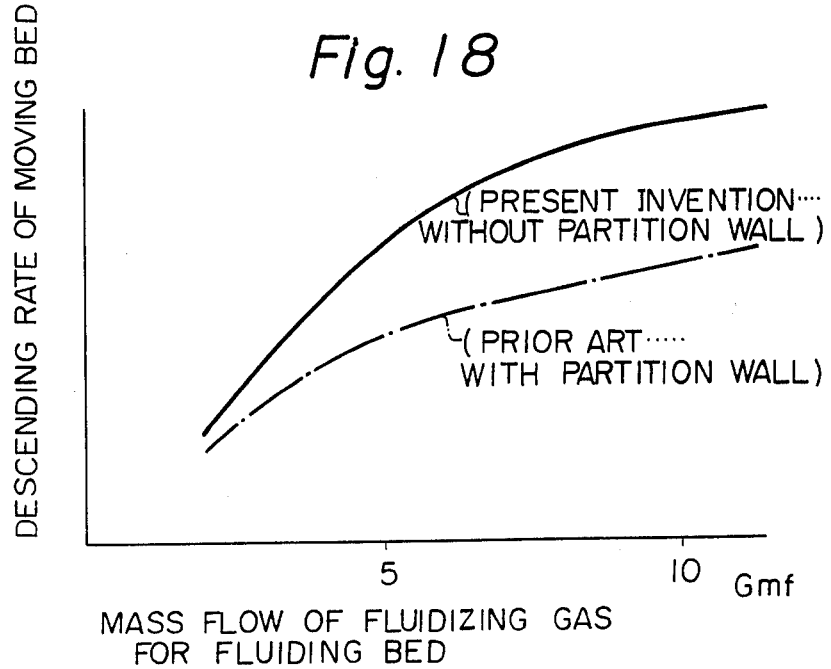
FIG. 18 is also a graph illustrating the relationship between the descending rate of the moving bed and the mass flow of the fluidizing gas for the fluidizing bed.

Referring to FIG. 18, there is shown relationship between the descending rate of the moving bed and the amount of the gas for fluidizing the fluidized beds in solid line the present invention and in dotted line for the reactor of the prior art having the separating wall. In this graph too, it is observed that, as the amount of the gas flow is increased, the descending rate is also increased.

As is clear from FIGS. 17 and 18, the reactor according to the present invention which has no interior separating wall has a larger capacity than that of the prior art which is provided with a partition wall.

Because of the fact that there is substantially no element inside of the reactor except for the fluidizing medium and the material charged thereinto through the charging opening 60, the incombustible constituents are smoothly discharged to the outside and there is substantially no problem such as deformation or corrosion of the feed chute or clogging of the incombustible items.

The composition of the municipal refuse is not fixed or stable and incombustible items having various sizes are usually mixed therein. Therefore, discharging of such incombustible items out of the reactor 6 is inevitable. When the incombustible items are discharged from the reactor 6, a certain amount of the fluidized medium, such as 20–30 times the incombustible items by weight is also discharged in association with the discharging of the incombustible items and such discharging is almost continuously effected.

Accordingly, smooth discharging of such incombustible items and the fluidized medium must be maintained substantially equally on both sides.

If such smooth discharge and equally balanced discharge on both sides is not maintained, the flow of the fluidized medium within the reactor may be disturbed and become unbalanced whereby the formation of the moving bed may not be kept stable. On the other hand, if a partition wall is provided to stabilize the formation of the moving bed, it may create drawbacks as discussed in connection with the prior art.

As explained referring to FIGS. 13 through 16, the discharge openings 48 are provided in the opposite sides of the reactor so as to equalize the discharging from both sides and the construction of the reactor is arranged to be substantially symmetrical about the center line 57 of the reactor to facilitate the equalized discharging and fluidization.

Since the inside of the reactor is a free space as explained, it is quite easy to inspect and maintain the inside thereof.

The horizontal cross-sectional shape of the reactor 6 is preferably rectangular, so that, when a different processing capacity is required, such as a larger capacity, the dimension of the reactor as measured in a direction normal to the plane of FIG. 13 may be extended or shortened whereby designing and installation are made relatively easy. According to the investigation made by the present inventors, the circulation rate of the fluidizing medium per unit volume of the fluidizing gas is not substantially affected even if said dimension of the reactor is widely changed whereby the scaling up of the reactor is easy.

Figure 19:
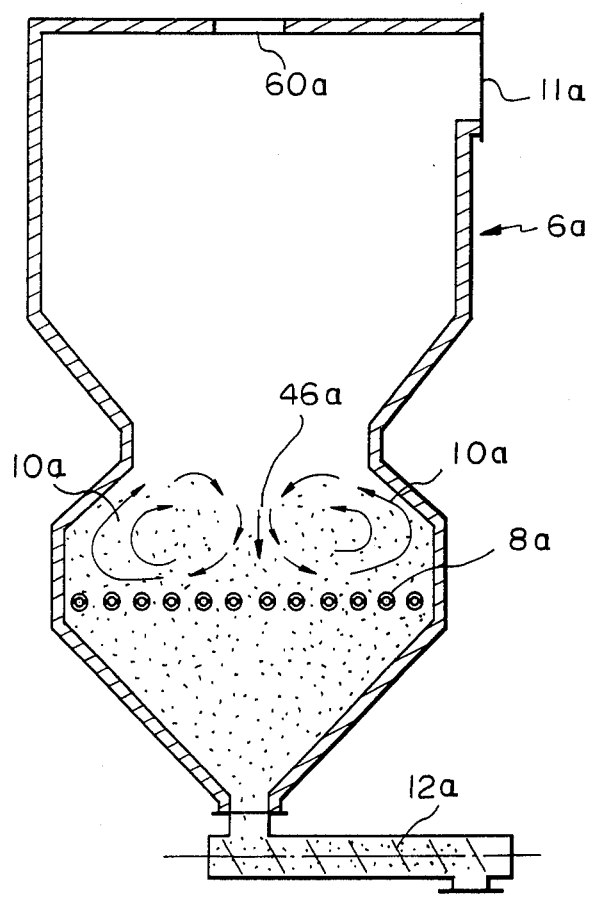
FIGS. 19, 20 and 21 illustrate a modified form of the reactor using a pipe grid in place of the diffusion plate shown in FIG. 1 and 13.
Figure 20:
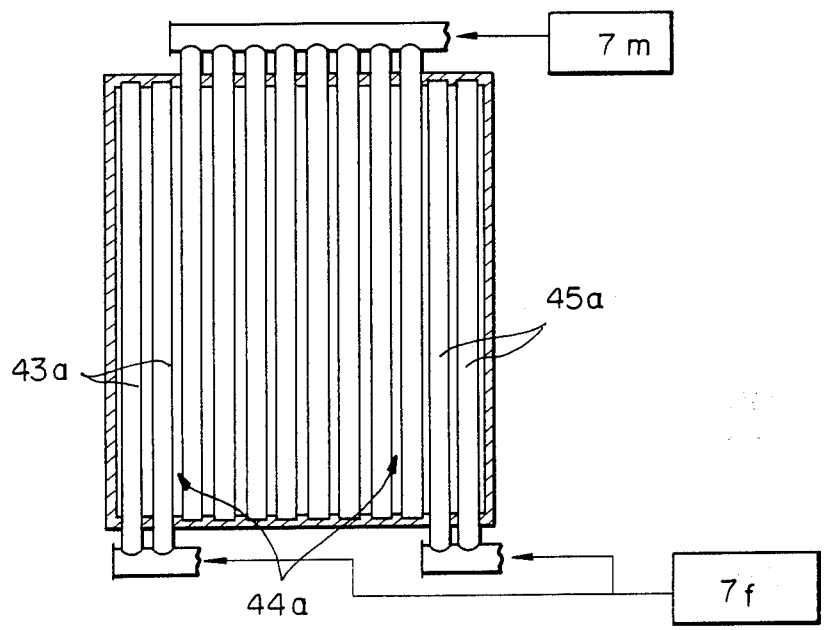
Figure 21:
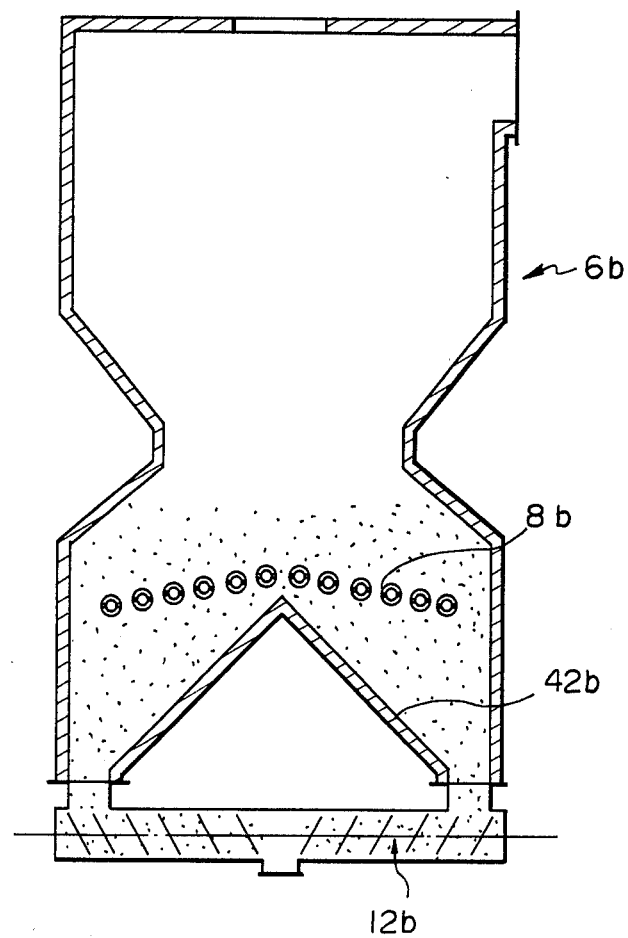

The foregoing embodiment has been described as one equipped with the diffusion plate means 8 consisting of plates 42, and the gas chambers 43, 44 and 45; however these may be replaced with a pipe grid as illustrated in FIGS. 19, 20 and 21. In FIG. 19, a simplified sectional view of a reactor 6a equipped with a pipe grid 8a is schematically illustrated and a plan view of the pipe grid 8a is also schematically illustrated in FIG. 20. The pipe grid 8a comprises a plurality of pipes 43a, 44a and 45a parallely arranged and each of the pipes is provided with a plurality of perforations along its length so that pressurized gas can be discharged upwardly therethrough when the pipes are supplied with the gas from blowers 7f and 7m.

The pipes 43a and 45a disposed adjacent the opposite side walls are coupled with a blower 7f and the pipes 44 disposed centrally are coupled with a blower 7m so that the gas discharged upwardly from the pipes 43a and 45a acts to generate fluidized beds 10a and the gas discharged upwardly from the pipes 44a acts to generate a moving bed 46a between the fluidized beds in a manner similar to that explained with respect to FIG. 13.

The arrangement of the pipes 43a, 44a and 45a need not necessarily be a chevron as are the plates 42 in FIG. 13 since the incombustible items may pass through the gaps between the pipes; however, the side walls of the reactor 6a below the pipe grid 8a are preferably inclined as illustrated so as to facilitate the movement of the incombustible items with the sand toward the discharge feeder 12a. The refuse is charged through the opening 60a and the waste gas is exhausted through a duct 11a.

In FIG. 21, a sectional view of a further modified reactor 6b is illustrated which is much like that shown in FIG. 19. In the reactor 6b, a pipe grid 8b is provided which comprises a plurality of pipes arranged similarly to those illustrated in FIGS. 19 and 20. The main difference from the reactor 6a is the portion below the pipe grid 8b. The side walls of the reactor in this portion are substantially vertical while the plates 42b are provided below the grid 8b to form a gable roof shape so as to facilitate the movement of the incombustible items and the sand or fluidizing medium toward the discharge feeder 12b. If it is desired to provide large gaps in the pipe grids 8a and 8b so that large incombustible items may pass therethrough, such large gaps are usually provided except for the central portion above where the moving bed is to be formed.

The advantage of the employment of the pipe grid is that replacement of the pipes is easy thereby making the maintainance of the diffusion mechanism in the reactor economical.

The present invention has been explained in detail referring to particular embodiments; however, it is to be noted that modifications and changes can be made by those skilled in the art within the spirit and scope of the present invention as defined in the appended claims.

What is claimed is:

1. A thermal reactor of the fluidized bed type, comprising:
   a vertical furnace housing having a generally rectangular horizontal cross-section;
   a diffusion means disposed in the lower portion of the inside of said housing and extending from one side wall to the opposite side wall of said housing, said diffusion means having a plurality of gas discharging means spaced across the width of the inside of said housing for discharging fluidizing gas upwardly into said housing, a pressurized fluiding gas source, and gas distributing means coupled between said gas source and said gas discharging means for supplying a greater mass flow of fluidizing gas to the gas discharging means adjacent the opposite side walls than that at the center portion of the width of the inside of said housing for producing a central fluidized bed of fluidized medium above said center portion and side fluidized beds of fluidized medium on opposite sides of said center fluidized bed adjacent said walls, said side fluidized beds whirling adjacent said side walls and moving upwardly and said central fluidized bed generally tending to descend between said two upwardly moving side fluidized beds, the top of said diffusion means being a single inverted V-shape cross-section member having the opposite lower ends adjacent said side walls;
   a material charging means operatively associated with said housing for charging material to be processed into said housing onto the top portion of said central fluidized bed;
   two deflecting means, one on each of the opposite side walls of said housing and extending inwardly toward each other with a gap between the inner ends thereof above the top of said central fluidized bed, the lower surfaces of said deflecting means being upwardly and inwardly inclined into said housing for deflecting the upward flow of said side fluidized beds toward the portion of said housing above said central fluidized bed, the space from the top of said diffusion means up to said two deflecting means and between the opposite side walls being clear of any obstructions to flow in the direction between said opposite side walls whereby said central fluidized bed and said side fluidized beds can contact each other freely; and discharge means in the bottom part of said furnace housing for discharging incombustible residue from said furnace housing.

2. A thermal reactor as claimed in claim 1 wherein said housing has an inlet in the top thereof, and material charging means comprises a feeder for charging material through said inlet, said feeder including a pair of parallel screws, means for rotating said screws in opposite rotational directions, respectively, for advancing the material toward said inlet, at least one of said screws being laterally displaceable for varying the spacing between the two screws when an unusual force is imposed on the screws by the material being conveyed.

3. A thermal reactor as claimed in claim 2 wherein said feeder comprises a feeder housing having an outlet port toward said inlet and an discharge port directed outside of said feeder housing at the opposite end from said outlet port, each of said pair of screws having a helical blade extending in a spiral direction opposite that of the other, said means for rotating said screws being reversible for reversing the direction of rotation of the respective screws so that the feeding direction is reversed when the rotation of said rotating means is reversed.

4. A thermal reactor as claimed in claim 3 wherein the helical pitches of the spirals on the respective screws is larger on the portions of the screws adjacent said outlet port than for the remaining portions of said screws.

5. A thermal reactor as claimed in claim 4 further comprising means for laterally displacing said one screw within a predetermined first range for increasing the spacing therebetween while the rotation of the screws continues in response to a force exerted on said screws when material is dragged into the space between the two screws and which force exceeds a predetermined value, and for further displacing said one screw beyond said first range and within a second predetermined range in response to a further increase in said force beyond said predetermined value, and means connected to said driving means responsive to the further increase in said force for reversing said driving means for reversing the direction of rotation of said screws to feed the material in the opposite direction toward said discharge port.

6. A thermal reactor as claimed in claim 5 wherein said feeder further includes a second pair of screws parallel to said firstmentioned pair of screws, a second normally inactive drive means for said second pair of screws, and means responsive to the further increase of force beyond said predetermined value and connected to said second drive means for driving said second pair of screws when said first pair of screws is driven to feed the material in the opposite direction.

7. A thermal reactor as claimed in claim 2 wherein said feeder housing has a side wall adjacent said one screw which is laterally displaceable together with said one screw.

8. A thermal reactor as claimed in claim 5 wherein said means for laterally displacing said one screw comprises a hydraulic system including hydraulic cylinders, and means for sensing the force derived from the material dragged into the space between the pair of screws by the pressure produced thereby in said cylinders.

9. A thermal reactor as claimed in claim 1 wherein said discharge means comprises a vertical duct at each of said opposite lower ends of said inverted V-shape cross-section member.

10. A thermal reactor as claimed in claim 9 wherein said discharge means comprises a discharge screw conveyor extending below said discharge ducts to receive incombustible residue from said ducts.

11. A thermal reactor as claimed in claim 10 wherein said screw conveyor comprises a single shaft having two helical blades thereon spaced along the length of said shaft and the helical directions of which are opposite to each other for feeding the residue received from said two ducts to a position between said two helical portions.

12. A thermal reactor as claimed in claim 5 wherein said discharge means comprises a vertical duct at each of said opposite lower ends of said inverted V-shape cross-section member.

13. A thermal reactor as claimed in claim 12 wherein said discharge means comprises a discharge screw conveyor extending below said discharge ducts to receive incombustible residue from said ducts.

14. A thermal reactor as claimed in claim 13 wherein said screw conveyor comprises a single shaft having two helical blades thereon spaced along the length of said shaft and the helical directions of which are opposite to each other for feeding the residue received from said two ducts to a position between said two helical portions.

15. A thermal reactor as claimed in claim 1 in which said discharge means includes discharge ducts positioned at the opposite sides of said diffusion means and a discharge mechanism below said diffusion means to which said ducts lead, said inverted V-shape cross-section member having the opposite lower ends adjacent said discharge ducts for aiding movement of the fluidized medium from the bottom of said central fluidized bed to the bottoms of said side fluidized beds and aiding movement of incombustible items toward said discharge ducts.

* * * * *